United States Patent [19]

Doornink

[11] Patent Number: 5,452,010

[45] Date of Patent: Sep. 19, 1995

[54] SYNCHRONIZING DIGITAL VIDEO INPUTS

[75] Inventor: Douglas J. Doornink, Portland, Oreg.

[73] Assignee: Tektronix, Inc., Wilsonville, Oreg.

[21] Appl. No.: 276,375

[22] Filed: Jul. 18, 1994

[51] Int. Cl.$^6$ .................. H04N 11/00; H04N 7/00
[52] U.S. Cl. .................. 348/497; 370/102;
370/108; 375/372; 348/715
[58] Field of Search ............ 348/497, 498, 499, 501,
348/505, 510, 511, 512, 513, 714, 715, 716, 718,
720, 567; 358/314, 336; 370/108, 102, 105.3, 84;
375/372; H04N 11/00, 7/00, 5/04, 5/08

[56] References Cited

U.S. PATENT DOCUMENTS

| | | | |
|---|---|---|---|
| 4,596,026 | 6/1986 | Cease et al. | 375/372 |
| 4,692,894 | 9/1987 | Bemis | 370/84 |
| 4,945,548 | 7/1990 | Lannarone et al. | 370/106.3 |
| 5,272,728 | 12/1993 | Ogawa | 375/372 |
| 5,359,366 | 10/1994 | Ubukata et al. | 348/537 |

OTHER PUBLICATIONS

"1990–91 Specialized Memories Data Book" Integrated Devices Technology, Inc., 1990.

*Primary Examiner*—James J. Groody
*Assistant Examiner*—Michael H. Lee
*Attorney, Agent, or Firm*—Francis I. Gray

[57] ABSTRACT

A system for synchronizing asynchronous video signals with a reference signal for input to a digital video processing system has a first-in, first-out (FIFO) buffer for each input signal that writes the digitized video signal into the FIFO under control of an input clock signal derived from the digitized video signal, and reads the digitized video signal from the FIFO under control of the reference signal. An input state machine monitors the digitized video signal at the input and the occupancy of the FIFO to provide a write enable signal to the FIFO so long as the FIFO is not in danger of overflowing. An output state machine monitors the digitized video signal at the output and the occupancy of the FIFO to provide a read enable signal to the FIFO so long as the FIFO is not in danger of underflowing. When the FIFO is in danger of overflowing, the write enable signal is disabled during the blanking interval of the digitized video signal for a pre-determined number of pixels; and when the FIFO is in danger of underflowing, the read enable signal is disabled during the blanking interval of the digitized video signal for a pre-determined number of pixels.

3 Claims, 1 Drawing Sheet

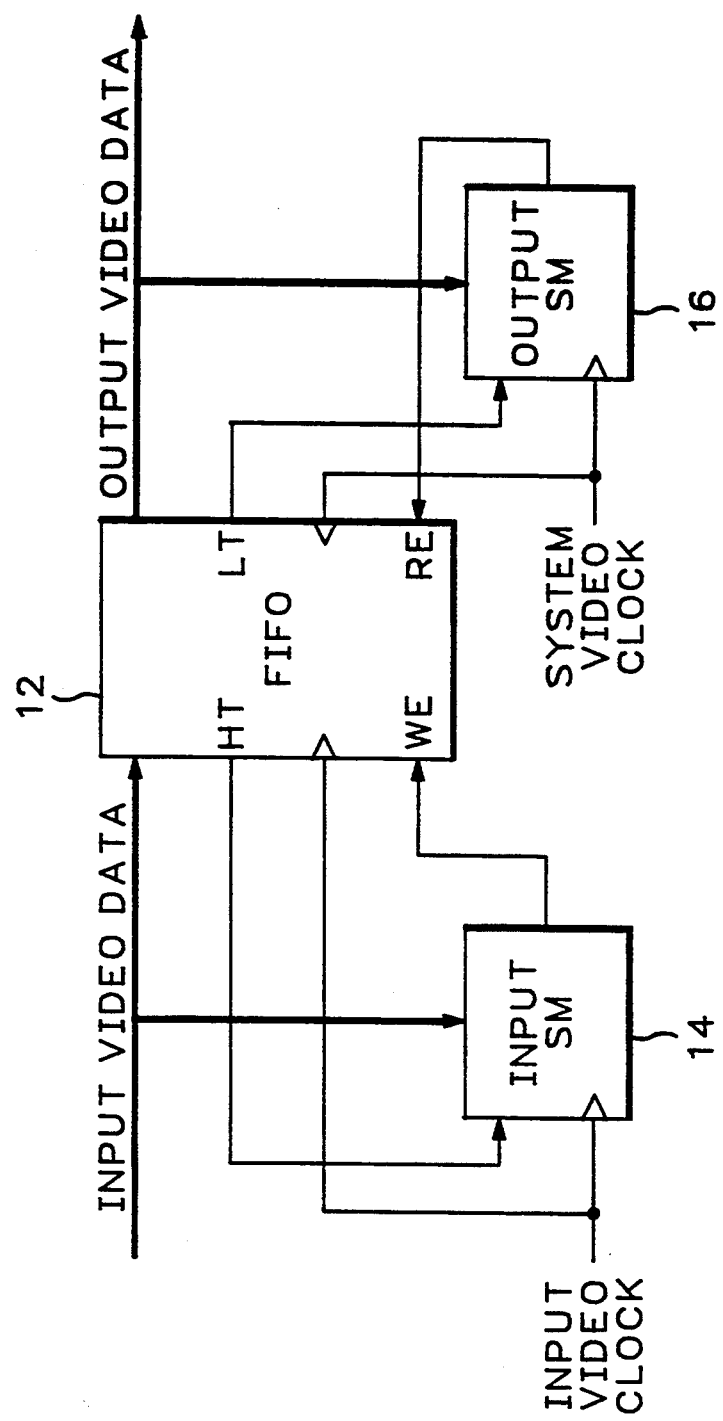

SYNCHRONIZING DIGITAL VIDEO INPUTS

BACKGROUND OF THE INVENTION

The present invention relates to systems using digital data, and more particularly to systems for allowing asynchronous video signals to be used as inputs to a digital video system which is synchronized to a system reference signal.

In current video systems if an input video signal is not synchronous to a common reference signal, such as "house black", some kind of video frame synchronizer is required. A video frame synchronizer writes a digitized input video signal into a frame buffer memory in synchronism with the input video signal, and reads the digitized input video signal from the frame buffer memory in synchronism with the common reference signal after a suitable delay, as is well known in the art. This requires that the input video signal be synchronized with the common reference signal. However if the input video signal is asynchronous to the common reference signal, the video frame synchronizer eventually drops or repeats a video frame. This behavior is undesirable, especially if the input video signal is being recorded.

SUMMARY OF THE INTENTION

Accordingly the present invention provides a method for synchronizing asynchronous digital video input signals to a single reference clock without the need for a frame synchronizer for each digital video input signal and without dropping or repeating a frame. A first-in, first-out (FIFO) buffer for each digital video input signal has separate read and write clock inputs and separate read and write controls. An input state machine, running on an input video clock derived from the digital video input signal, monitors the digital video data being written into the FIFO, monitors the occupancy of the FIFO and controls the writing of the digital video data into the FIFO at the input video clock rate. An output state machine, running on the single reference clock, monitors the digital video data being read from the FIFO, monitors the occupancy of the FIFO and controls the reading of the digital video data from the FIFO at the single reference clock rate. Since for many digital video systems the data in the horizontal and vertical intervals of the digital input signal are not processed, the digital video data received for writing into the FIFO during these intervals may be dropped if the FIFO is in danger of overflowing, as determined by the input state machine from the occupancy of the FIFO, and digital video data may be repeated during reading from the FIFO during these intervals if the FIFO is in danger of underflowing, as determined by the output state machine from the occupancy of the FIFO.

The objects, advantages and other novel features of the present invention are apparent from the following detailed description when read in conjunction with the appended claims and attached drawing.

BRIEF DESCRIPTION OF THE DRAWING

The FIGURE is a block diagram view of a system for synchronizing an asynchronous digital video input signal to a reference signal according to the present invention.

DESCRIPTION OF THE PREFERRED EMBODIMENT

Referring now to the Figure a first-in, first-out (FIFO) buffer 12, such as IDT72201 manufactured by Integrated Device Technology, Inc. of Santa Clara, Calif., United States of America, is shown having a digital video signal applied at an input, and providing from an output a synchronized digital video signal. At an input clock terminal of the FIFO 12 an input video clock, derived from the digital video signal at the input as is well known to those skilled in the art, is applied to provide clock pulses for incrementing a write address register (not shown) in the FIFO 12. At an output clock terminal a reference clock signal is applied to provide clock pulses for incrementing a read address register (not shown) in the FIFO 12. The FIFO 12 provides a high threshold signal and a low threshold signal, which signals are representative of the occupancy of the FIFO. Finally the FIFO 12 has a write enable input and a read enable input.

An input state machine 14 receives the digital video signal at an input, the input video clock at a clock input, and the high threshold signal from the FIFO 12 at a second input, The input state machine 14 provides a write enable signal to the write enable input of the FIFO 12. An output state machine 16 receives the synchronized digital video signal at an input, the reference clock signal at a clock input, and the low threshold signal from the FIFO 12 at a second input. The output state machine 16 provides a read enable signal to the read enable input of the FIFO In operation the input state machine 14 provides a write enable signal so that the digitized video signal at the input of the FIFO 12 normally is written into the FIFO on every input video clock pulse. The input state machine 14 monitors the video signal being input to the FIFO 12 and samples the high threshold signal from the FIFO. The digital video signal includes a start of active video (SAV) data word at the end of a blanking interval of the input video signal, and an end of active video (EAV) data word at the beginning of the blanking interval. When the input state machine 14 detects the EAV in the digital video signal, it checks the state of the high threshold signal to determine whether the FIFO occupancy is below a pre-determined threshold. If the high threshold signal indicates that the FIFO occupancy is below the predetermined threshold, the input state machine 14 continues to maintain the write enable signal to allow the digitized video signal to be written into the FIFO 12 on every input video clock pulse. If the high threshold signal indicates that the FIFO occupancy is above the pre-determined threshold, the input state machine 14 disables the write enable signal for a period of 4N input video clock pulses, effectively dropping N pixels since in the encoded video signal a "color pixel" is made up of four sequential data words, and allowing the FIFO occupancy to fall below the predetermined threshold. This prevents the FIFO 12 from overflowing. Since the pixels that are dropped occur during the blanking interval, none of the active video picture data is lost.

The output state machine 16 normally applies a read enable signal to the FIFO 12 so that the synchronized digital video signal is read from the FIFO on every reference clock pulse. The output state machine 16 monitors the synchronized digital video signal and samples the low threshold signal from the FIFO. When the output state machine 16 detects an EAV signal in the synchronized digital video signal, it checks to make sure that the FIFO occupancy is above a second pro-determined threshold. If the FIFO occupancy is above the second pro-determined threshold, as indicated by the state of the low threshold signal, the read enable signal is maintained and the synchronized digital video signal continues to be read from the FIFO 12. If the low threshold signal indicates that FIFO occupancy is below the second pro-determined threshold, then the output state machine 16 disables the read enable signal so that the same data word is read for 4M reference clock pulses. This effectively adds M pixels to the synchronized digital video signal during the blanking interval, and allows the FIFO occupancy to rise above the second pro-determined threshold. This keeps the FIFO 12 from underflowing, and since the pixels are added during the blanking interval, they are ignored when processed by subsequent digital video devices, such as a digital video recorder, which drop the data in the blanking interval.

Thus the present invention provides a method for synchronizing asynchronous digital video input signals to a single reference clock for storage on a digital video recorder by writing each digital video input signal into its own FIFO under control of an input state machine at an input video clock rate, and reading the digital video signal from the FIFO at the single reference clock rate to synchronize the digital video signal with the reference clock.

What is claimed is:

1. An apparatus for synchronizing a digital video signal at a first clock rate with a reference clock rate comprising:
   a buffer for storing the digital video signal at the first clock rate when enabled by a write enable signal and for outputting the digital video signal at the reference clock rate when enabled by a read enable signal;
   an input state machine for generating the write enable signal in response to the digital video signal being stored in the buffer, a high threshold signal from the buffer having a state indicating occupancy of the buffer, and the first clock rate; and
   an output state machine for generating the read enable signal in response to the digital video signal being output from the buffer, a low threshold signal from the buffer having a state indicating occupancy of the buffer, and the reference clock rate;
   such that if the state of the high threshold signal indicates that the buffer is in danger of overflowing, the write enable signal is inhibited during a blanking interval of the digital video signal being stored in the buffer for a first predetermined number of pixels of the digital video signal, and if the low threshold signal indicates that the buffer is in danger of underflowing, the read enable signal is inhibited during a blanking interval of the digital video signal being output from the buffer for a second predetermined number of pixels of the digital video signal.

2. An apparatus for synchronizing a digital video signal at a first clock rate with a reference clock rate comprising:
   means for storing the digital video signal at the first clock rate when enabled by a write enable signal and for outputting the digital video signal at the reference clock rate when enabled by a read enable signal;
   means for generating the write enable signal in response to the digital video signal being stored in the storing and outputting means, a high threshold signal from the storing and outputting means having a state indicating occupancy of the storing and outputting means, and the first clock rate; and
   means for generating the read enable signal in response to the digital video signal being output from the storing and outputting means, a low threshold signal from the storing and outputting means having a state indicating occupancy of the storing and outputting means, and the reference clock rate;
   such that if the state of the high threshold signal indicates that the storing and outputting means is in danger of overflowing, the write enable signal is inhibited during a blanking interval of the digital video signal being stored in the storing and outputting means for a first predetermined number of pixels of the digital video signal, and if the low threshold signal indicates that the storing and outputting means is in danger of underflowing, the read enable signal is inhibited during a blanking interval of the digital video signal being output from the storing and outputting means for a second predetermined number of pixels of the digital video signal.

3. A method of synchronizing a digital video signal with a reference signal having a system clock rate comprising the steps of:
   writing the digital video signal into a buffer when enabled by a write enable signal at an input clock rate, the input clock rate being derived from the digital video signal;
   reading the digital video signal from the buffer when enabled by a read enable signal at the system clock rate;
   generating the write enable signal from the digital video signal being written into the buffer, from a high threshold signal having a state indicating occupancy of the buffer, and from the input clock rate so that the write enable signal is disabled for a first pre-determined number of pixels of the digital video signal when the state of the high threshold signal indicates the buffer is in danger of overflowing; and
   generating the read enable signal from the digital video signal being read from the buffer, from a low threshold signal having a state indicating occupancy of the buffer, and from the system clock rate so that the read enable signal is disabled for a second pre-determined number of pixels of the digital video signal when the state of the low threshold signal indicates the buffer is in danger of underflowing.

* * * * *